Feb. 6, 1962 H. N. BLISS ETAL 3,019,974
AUTOMATIC NUMERAL WHEEL ALIGNING MECHANISM
Filed Sept. 11, 1958
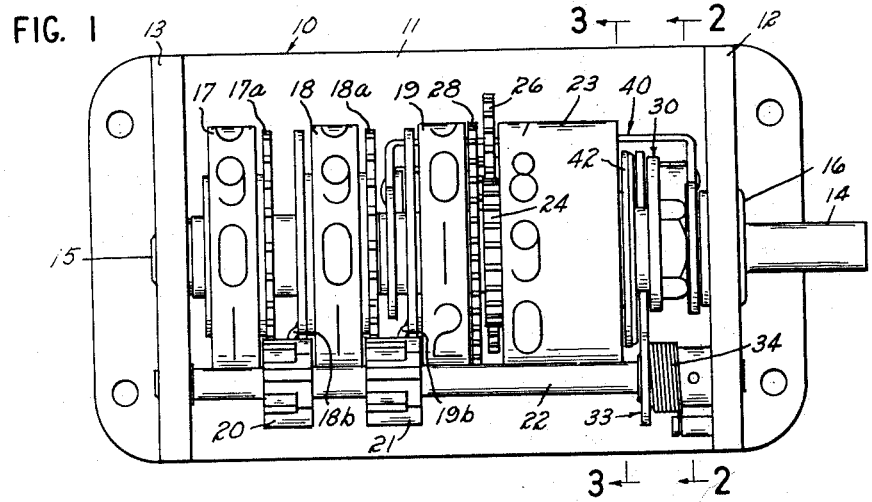
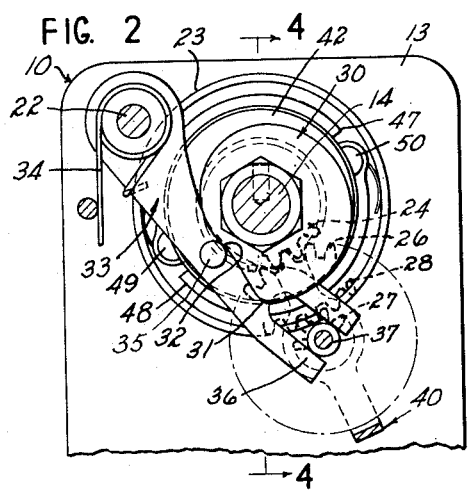
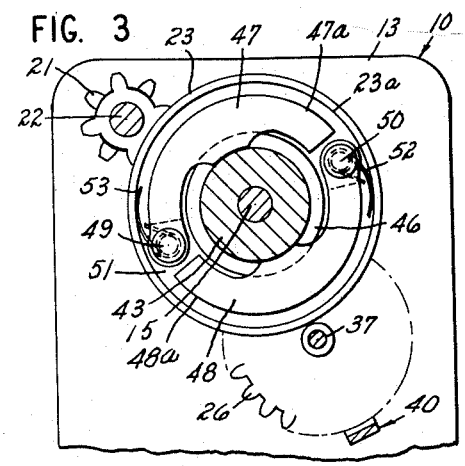
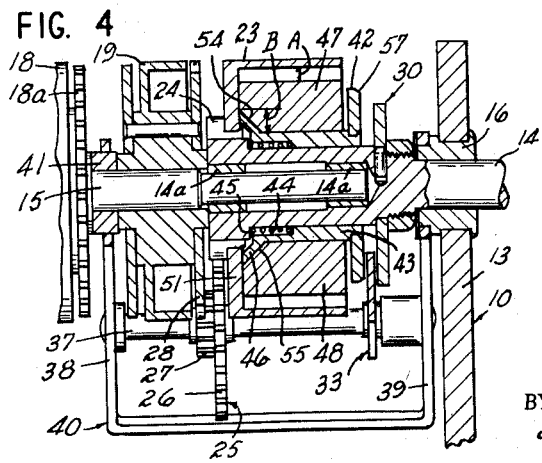
INVENTORS
HARVEY N. BLISS
HAROLD B. VROOM
BY *Lindsey and Prutzman*
ATTORNEYS 3,019,974
AUTOMATIC NUMERAL WHEEL ALIGNING MECHANISM
Harvey N. Bliss, Windsor, and Harold B. Vroom, Simsbury, Conn., assignors to Veeder-Root Incorporated, Hartford, Conn., a corporation of Connecticut
Filed Sept. 11, 1958, Ser. No. 760,364
7 Claims. (Cl. 235—136)

This invention relates generally to high-speed counters in which there is a continuous transfer between the lower order counting wheels and more specifically relates to such a counter having a numeral wheel aligning mechanism to permit accurate reading of the count. A counter of this type is disclosed and claimed in the Bliss Patent No. 2,716,524 entitled "Numeral Wheel Aligning Mechanism," assigned to the assignee of the present invention which is an improvement thereon.

It is an object of this invention to provide a high-speed counter whose lower order numeral wheels are automatically aligned by a novel transfer mechanism to permit accurate reading.

It is another object of this invention to provide a counter of the type referred to having a mechanism that will align the numerals while the counter is operating at counting speeds capable of being read by the human eye.

A further object of this invention is to provide an effective and practical numeral wheel aligning mechanism which does not subject the counter mechanism to excessive wear.

Still further features of the invention reside in the provision of an effective alignment mechanism that is both sturdy and low in cost.

Details of these objects and of the invention as well as other objects thereof are set forth in the following specification and illustrated in the accompanying drawings forming a part thereof, and the scope of the invention will be indicated in the appended claims.

In the drawings:

FIG. 1 is a top plan view of a preferred embodiment of the counter;

FIG. 2 is a partial cross section of the counter taken along the lines 2—2 of FIG. 1;

FIG. 3 is a partial cross section of the counter taken along the lines 3—3 of FIG. 1;

FIG. 4 is a partial cross section of the counter taken along the lines 4—4 of FIG. 2.

In the drawings, the counter is shown as having a frame designated generally by the numeral 10 and as including a base 11 and upright supporting members 12 and 13 which support the shafts 14 and 15. As is clearly seen in FIG. 4, shaft 15 is nested in the end of shaft 14 so as to provide mutual support between shafts 14 and 15 while bushings 14a permit relative rotation therebetween. In the illustrated embodiment, bushing 16 supports shaft 14 in upright member 12 for rotation by an external drive (not shown) relative to shaft 15.

Counter wheels 17, 18 and 19 are higher order wheels and carry driven gears 17a, 18a and two toothed driving gears 18b, 19b and are intermittently geared to each other by mutilated pinions 20 and 21, respectively. Pinions 20 and 21 are supported for rotation on shaft 22 which, in turn, is supported by upright members 12 and 13. Lowest order counting wheel 23 is continuously geared to next higher order counting wheel 19 through drive pinion 24, reduction gear 26, intermediate pinion 27, and drive gear 28 on number wheel 19. In the illustrated embodiment, a 10:1 reduction is provided by the gearing between each wheel.

The mechanism as thus far described provides continuous transfer between the two lowest order counting wheels and intermittent transfer between the second lowest counting wheel and all subsequent counting wheels. Intermittent gearing is possible between the higher order wheels because of the inherent speed reduction in such a counting operation between subsequent counting wheels.

Stoppage of the shaft 14 to permit a counting operation to be made will most often result in the numerals carried by counting wheel 19 being out of alignment with the numerals carried by the counting wheels 17 and 18 thereby introducing the possibility of an erroneous reading.

However, as hereinbefore mentioned, an object of this invention is to properly align the numerals on the counting wheels by an automatic operation which provides the desired alignment at all speeds capable of being read by the human eye. As seen in the drawings, a cam 30 is mounted on shaft 14 and is provided with a smoothly cycloidal configuration starting at high point 31 and smoothly diminishing in radial dimension in a counter-clockwise direction to low point 32. Cam follower 33 is pivotally supported on shaft 22 and has a laterally extending pin 35 positioned to engage cam 30. Pin 35 is biased into engagement with cam 30 by spring 34 acting between follower 33 and frame 10. The force to be exerted by spring 34 will necessarily vary with the position of mounting of frame 10 as well as with the number of higher order counting wheels on shaft 14. The transition from high point 31 to low point 32 on cam 30 is gradual rather than abrupt thereby reducing the velocity of follower 33 and increasing its ability to follow the configuration of cam 30. Cam follower 33 also has a bifurcated end 36 whose slot engages shaft 37 which is journaled in arms 38 and 39 of transfer unit supporting bracket 40. Arm 39 is journaled for rotation about hub 16 and arm 38 is journaled for rotation about hub 41.

Rotation of shaft 14 to perform a counting operation will rotate counting wheel 23, which in turn drives counting wheel 19 through transfer gears 26 and 27 that are mounted in bracket 40 for planetary movement about the counting wheel axis. Bracket 40 is made of aluminum or a similar light weight metal to reduce its mass and increase its ability to respond to movement of cam follower 33. As counting wheel 23 rotates, cam 30 rotates therewith to vary the position of cam follower 33 which, through bifurcated end 36 controls the planetary position of transfer unit 25. The shape of cam 30, which conforms to the magnitude of numeral designation on counting wheel 23, drives cam follower 33 against the bias of spring 34 to rotate transfer unit supporting bracket 40 so that counter wheel 19 is advanced to the next highest designation only when cam follower 33 makes the transition from the high point 31 to the low point 32 of cam 30 corresponding to the transition from 9 to 0 on wheel 23. In the preferred embodiment, this transition takes place between 8.5 to .5, the region of gradual transition between the high and low points of cam 30. Thus, for low speed counting operations, the aforementioned mechanism is a novel transfer mechanism that behaves like intermittent gearing to advance counter wheel 19 one numeral upon each complete revolution of counter wheel 23, thereby enabling counter wheel 19 to remain in registry with counter wheels 17 and 18 to permit easy and accurate reading thereof. In addition, this transfer mechanism acts to reduce shock loading on the transfer pinions associated with the higher order number wheels during a transfer operation.

However, as the speed of rotation of shaft 14 increases to the 500 r.p.m. range, it is apparent that, in the mechanism as thus far described, cam follower 33 will not properly follow the configuration of cam 30. Speeds beyond this range would not only make accurate reading difficult, but would also produce considerable drag on shaft 14, wear on cam 30 and follower 33, and considerable noise.

In accordance with further objects of the invention, disc 42 is provided with elongated hub 43 which is journaled for axial movement on shaft 14. Compression spring 44 acts between hub 43 and raised portion 45 of shaft 14 to urge disc 42 toward cam 30. Movement of disc 42 is prevented by the engagement of weights 47 and 48 with hub 43, as will be described subsequently. Weights 47 and 48 are pivotally supported at points 49 and 50 on the web 51 of counting wheel 23. Springs 52 and 53 act against the respective weights and the rim of counting wheel 23 to urge weights 47 and 48 into more intimate engagement with hub 43.

As is clearly seen in FIG. 4, the edge of weight 47 is cut away at point 54, and the edge of weight 48 is cut away at point 55 to define surfaces which generally conform to flared end 46 of hub 43.

Weights 47 and 48, in conjunction with hub 43, act as a clutch to permit axial movement of disc 42 under the influence of spring 44. As the speed of counting wheel 23 increases beyond the aforementioned 500 r.p.m. range, weights 47 and 48 are displaced by centrifugal force about pivot points 49 and 50 and away from hub 43 to permit axial movement of hub 43 and disc 42 under the influence of spring 44. As disc 42 moves, its external periphery engages cam follower 33 to lift pin 35 from the surface of cam 30, thereby allowing cam 30 to rotate freely while holding transfer unit 25 fixed in position. If desired, edge 57 of disc 42 can be beveled to facilitate the engagement of disc 42 with cam follower 33.

The degree of movement allowed to weights 47 and 48 is determined by the free space between the outer edges 47a and 48a of each weight and the inside edge 23a of counting wheel 23. As is seen in FIG. 4, this degree of movement, shown generally as the dimension "A," is less than the perpendicular height "B" of flange 46 of hub 43 and thus is insufficient to permit flange 46 to pass under the beveled edges 54 and 55 of weights 47 and 48. In addition, this construction enables the beveled edges 54 and 55 of weights 47 and 48 to act as cam surfaces to return the flared end 46 to the position shown in FIG. 4 when the counting wheel 23 is rotating at a speed less than the aforementioned 500 r.p.m. Thus, as the speed is reduced, the weights will move under the force of springs 52 and 53 towards the central shaft 14 so as to force flared end 46 to the position shown in FIG. 4 allowing pin 35 on cam follower 33 to engage cam 30, thereby returning the mechanism to the automatic numeral wheel aligning condition.

It is to be understood, of course, that the mass of the weights 47 and 48 and force exerted by springs 52 and 53 will determine the speed at which cam follower 33 is elevated from the surface of cam 30. Therefore, this speed can be changed by proper selection of the aforementioned parameters.

It is thus seen that this invention provides an automatic numeral alignment mechanism for a high speed counter in which there is a continuous transfer between the lower order counting wheels, and that this mechanism is rendered inoperative at counting speeds beyond which the eye cannot discern numeral presentation so as to protect the mechanism from excessive wear and reduce drive shaft loading and counter noise.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. In a counter having first and second counter wheels mounted on a common axis for relative rotation and a continuous transfer mechanism interconnecting said counter wheels, said transfer mechanism being supported for planetary movement about the common axis, the counter wheel aligning mechanism comprising a cam mounted for rotation with said first counter wheel about the common axis, said cam having a configuration corresponding to the various portions of said first counter wheel, a cam follower engaging said cam and operable between said cam and said transfer mechanism to control the planetary position of said transfer mechanism in accordance with the configuration of said cam, and means carried by said first counter wheel and operable upon occurrence of a given speed of rotation of said first counter wheel to displace said cam follower from said cam.

2. In a counter having first and second counter wheels mounted on a common axis for relative rotation, a continuous transfer mechanism interconnecting said counter wheels, and means supporting the transfer mechanism for planetary movement about the common axis, the counter wheel aligning mechanism comprising a cam mounted for rotation with said first counter wheel about the common axis, said cam having a configuration corresponding to the various portions of said first counter wheel, a cam follower engaging said cam and operable between said cam and said transfer mechanism to control the planetary position of said transfer mechanism in accordance with the configuration of said cam, and means including a pair of movable weights carried by said first counter wheel operable upon occurrence of a given speed of rotation of said first counter wheel to displace said cam follower from said cam.

3. In a counter having first and second counter wheels mounted for relative rotation on a common axis and a continuous transfer mechanism interconnecting said counter wheels, said transfer mechanism being supported for planetary movement about the common axis, the counter wheel aligning mechanism comprising a cam mounted for rotation with said first counter wheel about the common axis, said cam having a configuration corresponding to the magnitude of counting indication distributed on said first counter wheel, a cam follower operable between said cam and said transfer mechanism to control the planetary position of said second counter wheel in accordance with said cam configuration, a circular disc mounted for axial movement along said common axis, and means carried by said first counting wheel and operable to move said disc into supporting engagement with said cam follower upon occurrence of a given speed of rotation of said first counter wheel.

4. In a counter as set forth in claim 3 wherein the means operable to move said disc into supporting engagement with said cam follower comprises a hub having one end fixed to said disc and having its other end outwardly flared, a spring urging said disc towards said cam follower, a pair of weights, each said weight having one end pivotally supported on said first counter wheel, and spring means urging said weights towards said common axis and into engagement with the flared end of said hub.

5. The counter of claim 3 wherein said disc has a beveled peripheral edge to facilitate engagement with said cam follower.

6. In a counter having a supporting frame, first and second counter wheels mounted for relative rotation on a common axis supported by said frame, said first counter wheel being supported by a web and having a cylindrical shape defining a hollow portion adjacent said common axis, and a continuous transfer mechanism interconnecting said counter wheels, said transfer mechanism being supported for planetary movement about said common axis, the counter wheel aligning mechanism comprising a cam mounted for rotation with said first counter wheel about the common axis, said cam having a configuration corresponding to the magnitude of counting indication distributed on said first common wheel, a cam follower pivotally supported on said frame, said cam follower having a first portion engageable with said cam and having a second portion in engagement with said transfer unit, means urging said cam follower into engagement with said cam, a disc mounted for axial movement along said common axis, said disc having a hub extending within the hollow portion of said first counter wheel, said hub having a flared end adjacent said first counter wheel web, a pair of weights pivotally supported on said first counter wheel for movement in a plane generally perpendicular to the common axis, means urging each of said weights towards said common axis and into engagement with the flared portion of said hub, and spring means operable between said first counter wheel web and said disc to urge said disc into a supporting position for said cam follower, said disc having a beveled edge to facilitate supporting engagement with said cam follower whereby occurrence of a predetermined speed of rotation of said first counter wheel will displace said weights so as to release said hub thereby allowing the hub to be urged into a position in which it engages said cam follower and holds said cam follower away from said cam surface and fixes the planetary position of said transfer unit.

7. In a counter having a frame, a fixed shaft, a second shaft rotatably encircling a portion of said fixed shaft, said fixed shaft and second shaft being supported by said frame, a first counter wheel mounted on said second shaft for rotation therewith, a second counter wheel rotatably supported on said fixed shaft, each of said counter wheels having spaced numerals thereon, a gear mounted for rotation with each counter wheel, and a transfer gear unit engaging each of said counter wheel gears, said transfer gear unit being supported on a bracket journaled for rotation about said shafts in a planetary manner, the counter wheel aligning mechanism comprising a cam mounted for rotation with said first counter wheel and having a configuration corresponding to the magnitude of counting indication distributed on said first counter wheel, a cam follower pivotally supported on said frame, said follower having a first portion engageable with said cam and a second portion in engagement with said transfer gear unit, a disc having a hub portion journaled for axial movement on said second shaft, said hub having an outwardly flared end portion adjacent said first counter wheel, spring means urging said flared portion away from said counter wheel, a pair of weights pivotally supported on said first counter wheel for movement in a plane perpendicular to the axis of said second shaft, and means urging said weights towards said second shaft into engagement with said hub flared portion, said disc having a radial dimension sufficient to hold said cam follower out of engagement with said cam when in engagement with said cam follower.

References Cited in the file of this patent
UNITED STATES PATENTS

| | | |
|---|---|---|
| 2,390,444 | Mefferd | Dec. 4, 1945 |
| 2,456,101 | Yeasting | Dec. 14, 1948 |
| 2,980,326 | Crooke | Apr. 18, 1961 |